US012097968B2

(12) United States Patent
Onur et al.

(10) Patent No.: US 12,097,968 B2
(45) Date of Patent: Sep. 24, 2024

(54) SYSTEM AND METHOD FOR AIR SEPARATION MODULE MANAGEMENT

(71) Applicant: The Boeing Company, Chicago, IL (US)

(72) Inventors: Can Onur, Madrid (ES); Pieter van Gils, Madrid (ES); Maxim Constantijn Vos, Madrid (ES); Daniel Ramiro Rebollo, Madrid (ES); Barend-Jan van Bruchem, Madrid (ES)

(73) Assignee: THE BOEING COMPANY, Chicago, IL (US)

( * ) Notice: Subject to any disclaimer, the term of this patent is extended or adjusted under 35 U.S.C. 154(b) by 455 days.

(21) Appl. No.: 17/363,727

(22) Filed: Jun. 30, 2021

(65) Prior Publication Data

US 2022/0063831 A1 Mar. 3, 2022

(30) Foreign Application Priority Data

Aug. 28, 2020 (EP) .................................... 20382768

(51) Int. Cl.
 *B64D 37/32* (2006.01)
 *A62C 3/08* (2006.01)
 (Continued)

(52) U.S. Cl.
 CPC ................ *B64D 37/32* (2013.01); *A62C 3/08* (2013.01); *B01D 53/00* (2013.01); *B01D 53/30* (2013.01);
 (Continued)

(58) Field of Classification Search
 CPC .. B64D 37/32; B64D 2013/0681; A62C 3/08; B01D 53/00; B01D 53/30;
 (Continued)

(56) References Cited

U.S. PATENT DOCUMENTS

| 2004/0065383 A1* | 4/2004 | Jones | A62B 7/14 |
| | | | 141/66 |
| 2007/0000380 A1* | 1/2007 | Leigh | B01D 53/0454 |
| | | | 96/113 |

(Continued)

FOREIGN PATENT DOCUMENTS

| GB | 2576951 A | 3/2020 |
| WO | 2016118192 A1 | 7/2016 |

OTHER PUBLICATIONS

Communication pursuant to Article 94(3) EPC for EP Patent Application No. 20382768.8, mailed Aug. 4, 2023, 5 pages.

(Continued)

*Primary Examiner* — Dale W Hilgendorf
(74) *Attorney, Agent, or Firm* — Sage Patent Group

(57) ABSTRACT

A method for air separation module management includes determining an amount of nitrogen-enriched-air to be supplied to each fuel tank of a plurality of fuel tanks of an aircraft. The method also includes evaluating a status and usage of each air separation module of a plurality of air separation modules onboard the aircraft. The method additionally includes determining an optimal distribution of workload among the plurality of air separation modules based on the amount of the nitrogen-enriched-air to be supplied to each fuel tank and the status and usage of each air separation module. The method further includes regulating a valve associated with each air separation module or a group of air separation modules based on the optimal distribution of workload to each air separation module.

20 Claims, 8 Drawing Sheets

(51) Int. Cl.
  *B01D 53/00* (2006.01)
  *B01D 53/30* (2006.01)
  *B01J 19/14* (2006.01)
(52) U.S. Cl.
  CPC ........... *B01J 19/14* (2013.01); *B01D 2256/10* (2013.01); *B01D 2257/104* (2013.01); *B01D 2259/4575* (2013.01)
(58) Field of Classification Search
  CPC .......... B01D 2256/10; B01D 2257/104; B01D 2259/4575; B01J 19/14
  See application file for complete search history.

(56) References Cited

U.S. PATENT DOCUMENTS

| | | | | | |
|---|---|---|---|---|---|
| 2008/0060523 | A1* | 3/2008 | Tom | ................... | B01D 53/0446 96/109 |
| 2014/0331857 | A1* | 11/2014 | Massey | ................. | B64D 37/32 95/35 |
| 2015/0040984 | A1* | 2/2015 | Ji | ........................... | B64D 37/32 137/334 |
| 2016/0206995 | A1* | 7/2016 | Rugg | ..................... | B64D 37/32 |
| 2016/0214732 | A1* | 7/2016 | Vigliotta | ................ | B64D 37/32 |
| 2016/0361684 | A1* | 12/2016 | Ranjan | ................. | B01D 53/228 |
| 2017/0014752 | A1* | 1/2017 | Thibaud | ................. | B01D 53/22 |
| 2017/0018125 | A1* | 1/2017 | Jover | ....................... | G07C 5/02 |
| 2018/0126202 | A1* | 5/2018 | Vandroux | ............. | A62C 3/065 |
| 2019/0002119 | A1* | 1/2019 | Jensen | ................... | B64D 37/32 |
| 2020/0079522 | A1* | 3/2020 | Jomain | ..................... | B64F 1/28 |
| 2020/0164307 | A1* | 5/2020 | Claris | .................... | B64D 37/32 |

OTHER PUBLICATIONS

Extended European Search Reported mailed Feb. 17, 2021 for European Patent Application No. 20382768.8, 7 pages.

* cited by examiner

US 12,097,968 B2

SYSTEM AND METHOD FOR AIR SEPARATION MODULE MANAGEMENT

CROSS-REFERENCE TO RELATED APPLICATIONS

The present application claims benefit of priority to European Patent Application No. 20382768.8, filed Aug. 28, 2020.

FIELD

The subject disclosure relates to flammability reduction systems onboard an aircraft and more particularly to a system and method for air separation module management.

BACKGROUND

An air separation module (ASM) is a core element of a flammability reduction system (FRS) onboard an aircraft. The ASM separates oxygen from air to supply nitrogen-enriched-air into the ullage of the fuel tanks of the aircraft. The ASM is a costly component of the FRS. Additionally, the downtime for replacement of an ASM is substantially higher than other maintenance work associated with the FRS. Further, long-haul aircraft usually have multiple ASMs. This results in substantial maintenance cost and hours of downtime when the ASM units need to be replaced.

SUMMARY

In accordance with an example, a method for air separation module management includes determining an amount of nitrogen-enriched-air to be supplied to each fuel tank of a plurality of fuel tanks of an aircraft and evaluating a status and usage of each air separation module of a plurality of air separation modules onboard the aircraft. The method also includes determining an optimal distribution of workload among the plurality of air separation modules based on the amount of the nitrogen-enriched-air to be supplied to each fuel tank and the status and usage of each air separation module. The method further includes regulating a valve associated with each air separation module or a group of air separation modules based on the optimal distribution of workload to each air separation module.

In accordance with another example, a system for air separation module management includes a controller for air separation module management. The controller includes a processor and a memory associated with the processor. The memory includes computer-readable program instructions that, when executed by the processor causes the processor to perform a set of functions including determining an amount of nitrogen-enriched-air to be supplied to each fuel tank of a plurality of fuel tanks of an aircraft and evaluating a status and usage of each air separation module of a plurality of air separation modules. The set of functions also include determining an optimal distribution of workload among the plurality of air separation modules based on the amount of the nitrogen-enriched-air to be supplied to each fuel tank and the status and usage of each separation module. The set of functions further include regulating a valve associated with each air separation module or a group of air separation modules based on the optimal distribution of workload among each air separation module.

In accordance with another example, a flammability reduction system onboard an aircraft includes a plurality of air separation modules connected in parallel. The plurality of air separation modules are configured to selectively supply nitrogen-enriched-air to each fuel tank of a plurality of fuel tanks of the aircraft. The flammability reduction system also includes an air separation module (ASM) management system. The air separation management system includes an ASM management module configured to determine an optimal distribution of workload among the plurality of air separation modules based on an amount of nitrogen-enriched-air to be supplied to each fuel tank and a status and usage of each air separation module. The air separation management system also includes a valve associated with each air separation module or a group of the air separation modules of the plurality of air separation modules. Each of the valves is regulated based on the optimal distribution of the workload among the air separation modules.

In accordance with an example and any of the preceding examples, wherein determining the amount of the nitrogen-enriched-air to be supplied to each fuel tank includes determining an amount of oxygen in nitrogen-enriched-air flowing from the plurality of air separation modules.

In accordance with an example and any of the preceding examples, wherein determining the amount of the nitrogen-enriched-air to be supplied to each fuel tank includes determining an amount of oxygen in the nitrogen-enriched-air flowing from the plurality of air separation modules and determining an amount of oxygen in conditioned air being supplied to the plurality of air separation modules from an air supply control system.

In accordance with an example and any of the preceding examples, wherein determining the amount of the nitrogen-enriched-air to be supplied to each fuel tank includes determining an amount of oxygen in the nitrogen-enriched-air flowing individually from each air separation module of the plurality of air separation modules.

In accordance with an example and any of the preceding examples, wherein determining the amount of the nitrogen-enriched-air to be supplied to each fuel tank includes determining an amount of oxygen in the nitrogen-enriched-air flowing individually from each air separation module of the plurality of air separation modules and determining an amount of oxygen in conditioned air being supplied to the plurality of air separation modules from an air supply control system.

In accordance with an example and any of the preceding examples, wherein determining the amount of the nitrogen-enriched-air to be supplied to each fuel tank includes determining a need of the nitrogen-enriched-air in ullage of each fuel tank.

In accordance with an example and any of the preceding examples, wherein determining the need of the nitrogen-enriched-air in the ullage of each fuel tank includes using a set of parameters including a phase of flight of the aircraft, an outside air temperature, an altitude of the aircraft, fuel tank usage, and engine settings.

In accordance with an example and any of the preceding examples, wherein determining the amount of the nitrogen-enriched-air to be supplied to each fuel tank includes using an amount of oxygen in nitrogen-enriched-air flowing from the plurality of air separation modules and a set of parameters including a phase of flight of the aircraft, an outside air temperature, an altitude of the aircraft, fuel tank usage, and engine settings.

In accordance with an example and any of the preceding examples, further including generating data corresponding to the amount of nitrogen-enriched-air to be supplied to each fuel tank based on a set of parameters including a phase of flight of the aircraft, an outside air temperature, an altitude of the aircraft, fuel tank usage, engine settings, an amount of oxygen in the nitrogen-enriched-air flowing from the plurality of air separation modules, and ullage of each fuel tank.

In accordance with an example and any of the preceding examples, wherein evaluating the status and the usage of each air separation module includes monitoring an amount of usage of each air separation module of the plurality of air separation modules; evaluating the status and usage of each air separation module using a benchmark performance database; and generating data corresponding to the status and usage of each air separation module. The data is used in the determining the optimal distribution of workload among each air separation module.

In accordance with an example and any of the preceding examples, wherein determining the optimal distribution of workload among the plurality of air separation modules includes ranking each air separation module of the plurality of air separation modules based on an amount of prior usage; and using a selected air separation module or a combination of selected air separation modules according to a strategy for the optimal distribution of workload among the plurality of air separation modules.

In accordance with an example and any of the preceding examples, wherein a lower ranking of a particular air separation module corresponds to a lower amount of prior usage of the particular air separation module, and wherein the strategy for the optimal distribution of workload among the plurality of air separation modules includes using the selected air separation module or the combination of selected air separation modules with the lower ranking or rankings before the air separation modules with the higher rankings to balance an amount of usage among the air separation modules.

In accordance with an example and any of the preceding examples, wherein determining the optimal distribution of workload among the plurality of air separation modules includes using particular air separation modules of the plurality of air separation modules having a lower amount of usage before other air separation modules having a higher amount of usage to balance an amount of usage among the air separation modules.

In accordance with an example and any of the preceding examples, further including a sensor configured to determine an amount of oxygen in the nitrogen-enriched-air being supplied to the fuel tanks.

In accordance with an example and any of the preceding examples, further including a sensor associated with each air separation module. Each sensor is configured to determine an amount of oxygen in the nitrogen-enriched-air flowing from the associated air separation module.

In accordance with an example and any of the preceding examples, further including an output sensor configured to determine an amount of oxygen in the nitrogen-enriched-air flowing from the plurality of air separation modules; and an input sensor configured to determine an amount of oxygen in the conditioned air being supplied to the plurality of air separation modules from an air supply control system.

In accordance with an example and any of the preceding examples, further including downloading in-service data associated with each of the plurality of air separation modules to an application off-board the aircraft for analyzing the in-service data; and analyzing the in-service data according to a strategy for optimal distribution of workload among the air separation modules.

The features, functions, and advantages that have been discussed can be achieved independently in various examples or may be combined in yet other examples further details of which can be seen with reference to the following description and drawings.

DETAILED DESCRIPTION

The embodiments described herein enable a controlled management of a set of air separation modules that are components of a flammability reduction system onboard an aircraft or other vehicle. The embodiments described herein also track usage of the air separation modules and ensure wear of all the air separation modules according to a predetermined schedule or pattern of wear or use to optimize their usage and increase their lifespan. In accordance with an example, the predetermined schedule or pattern of wear or use is parallel wear or use of the air separation modules. Other patterns of wear or use are used in other examples using active control for example. The system for air separation module management also enables system failure diagnostics and/or prognostics by using a benchmark performance database that includes a reference digital-twin of each air separation module. In some examples, the system failure diagnostics and/or prognostics are performed onboard the aircraft. Some examples include an on-board reference digital model hosted in a nitrogen-enriched-air (NEA) controller or other on-board device. In other examples, the system failure diagnostics and/or prognostics are performed off-board. These examples include an off-board application for analyzing air separation module (ASM) in-service data during turn-around time of the aircraft on a certain regular basis.

The system and method for ASM management monitors ASM performance using one or more oxygen sensor and controls utilization of the air separation modules using upstream or downstream valves as described herein. The valves are regulatable to optimize performance of each air separation module and usage according to the performances and usages of the other air separation modules onboard to increase the lifetime of all the air separation modules, while controlling their individual degradations. Changes in the responses of the valves over time establish a health and performance assessment method for the air separation modules, thus facilitating a conditional-based maintenance plan that will recommend to conduct replacement of a particular air separation module at the right time, reducing downtime of maintenance tasks if a single air separation module needs to be replaces rather than an entire set. Additionally, monitoring the performance of the air separation modules using the benchmark performance database improves the health and performance assessment of the entire flammability reduction system.

Figure 1:
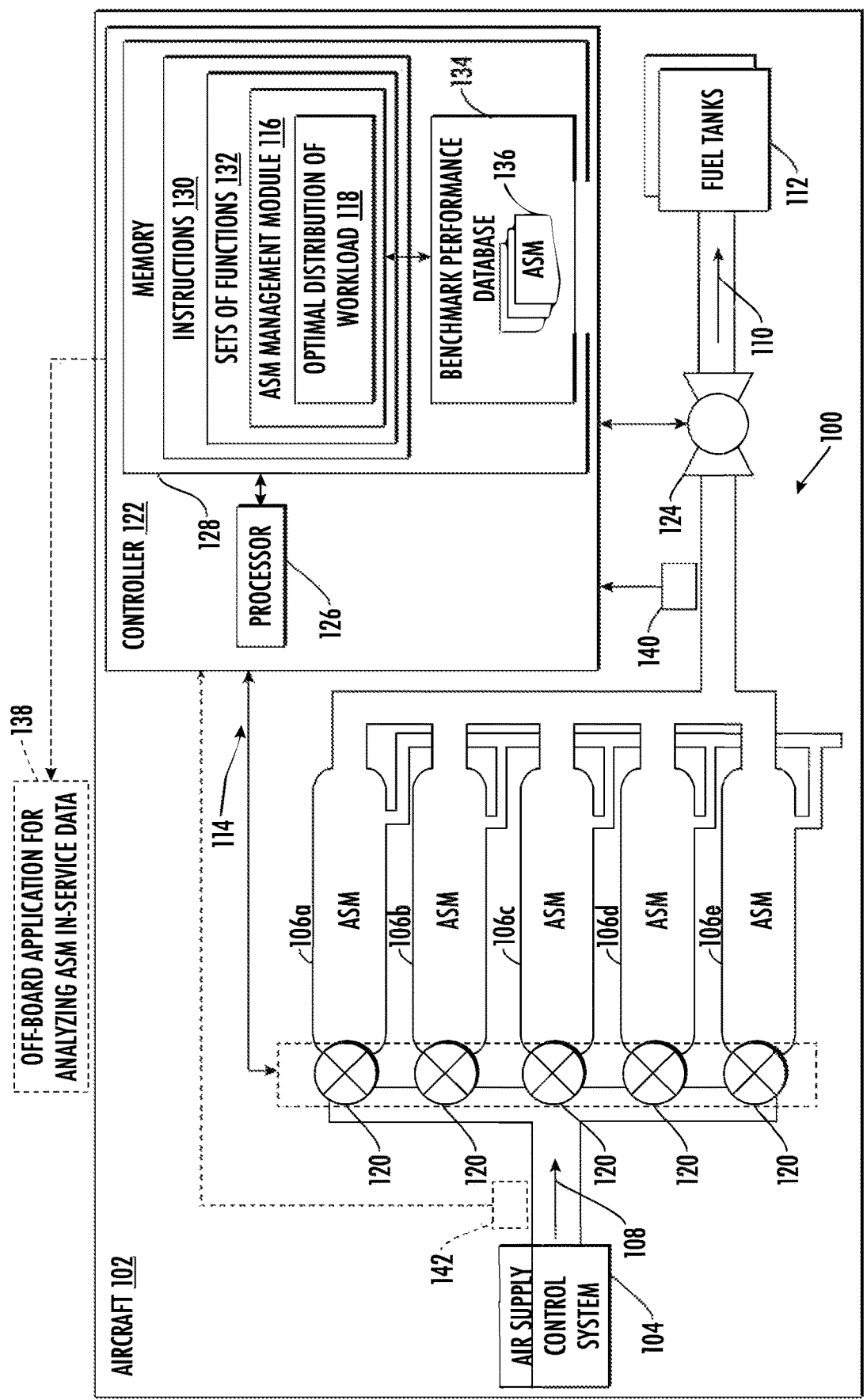
FIG. 1 is a block schematic diagram of an example of a flammability reduction system onboard an aircraft in accordance with an example of the present disclosure.

FIG. 1 is a block schematic diagram of an example of a flammability reduction system 100 onboard an aircraft 102 in accordance with an example of the present disclosure. The flammability reduction system 100 includes a plurality of air separation modules 106 connected in parallel. The flammability reduction system 100 receives air from an air supply control system 104. The air supply control system 104 is configured to supply conditioned air 108 to the plurality of air separation modules 106. In some examples, the air supply control system 104 is configured to withdraw bleed air from the engines and then regulates the pressure and temperature of the air. The plurality of air separation modules 106 are configured to selectively supply nitrogen-enriched-air 110 to each fuel tank 112 of a plurality of fuel tanks 112 of the aircraft 102. In the example in FIG. 1, the exemplary flammability reduction system 100 includes five air separation modules 106 (referenced as 106a-106e). In other examples, the flammability reduction system 100 will have less than five air separation modules 106 or more than five air separation modules 106 depending upon the number and size of the fuel tanks and engines of a particular aircraft.

The flammability reduction system 100 also includes a system 114 for air separation module (ASM) management or ASM management system 114. The ASM management system 114 includes an ASM management module 116 configured to determine an optimal distribution of workload 118 among the plurality of air separation modules 106 based on an amount of nitrogen-enriched-air 110 to be supplied to each fuel tank 112 and a status and usage of each air separation module 106.

Figure 3:
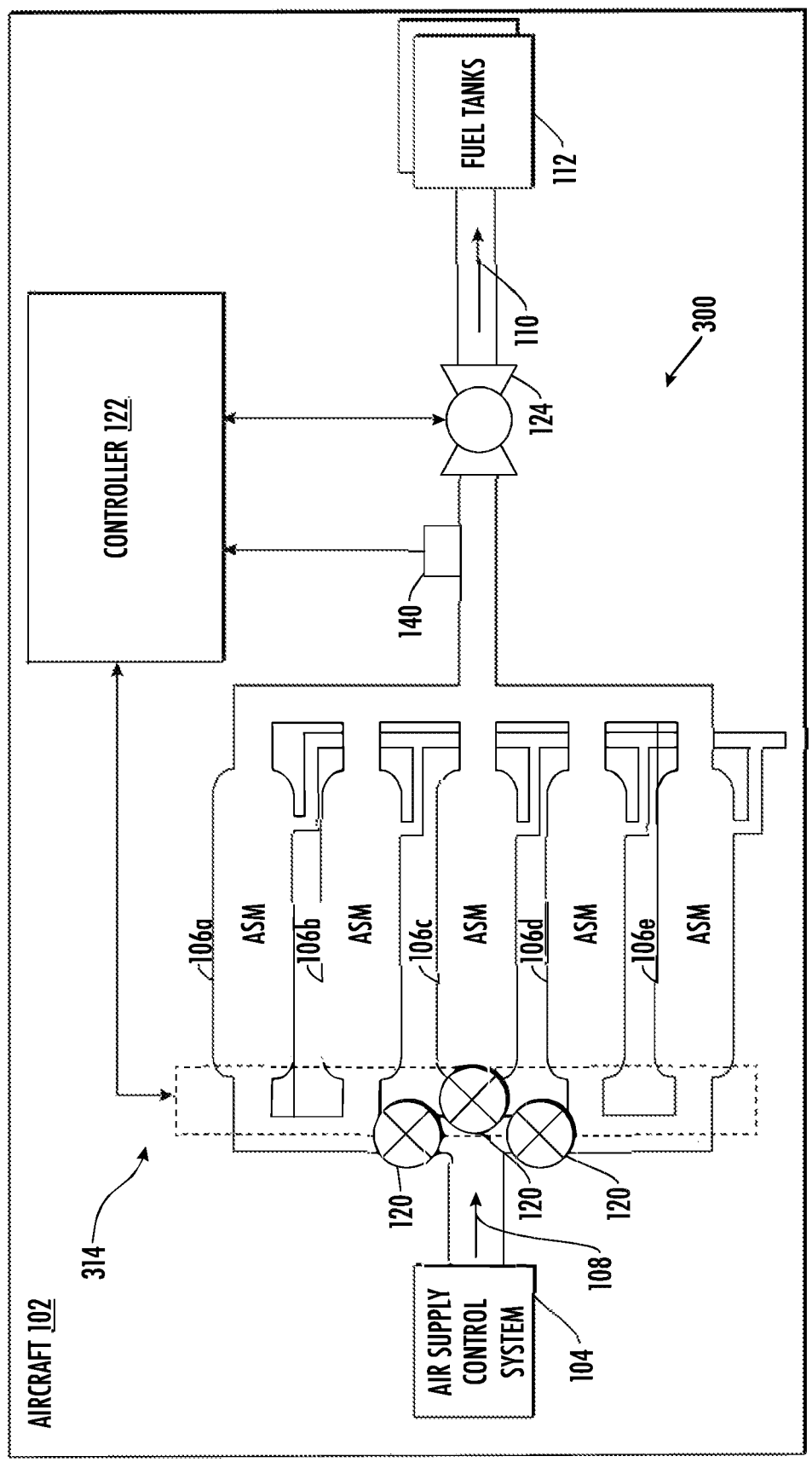
FIG. 3 is a block schematic diagram of another example of a flammability reduction system onboard an aircraft in accordance with the present disclosure.

The ASM management system 114 also includes a valve 120 associated with each air separation module 106 or a group of the air separation modules 106 (as illustrated in the example of FIG. 3) of the plurality of air separation modules 106. Each of the valves 120 is regulated based on the optimal distribution of workload 118 among the air separation modules 106. In the example in FIG. 1, a flow rate of conditioned air 108 into each air separation module 106 is controlled by individually regulating the valve 120 associated with each air separation module 106 or group of air separation modules 106 (FIG. 3). In the example in FIG. 1, the valve 120 associated with each air separation module 106 or group of air separation modules 106 (FIG. 3) is upstream from the air separation modules 106. In the example in FIG. 4, the valve 120 associated with each air separation module 106 is downstream from the air separation modules 106. In other examples, valves 120 associated with a group of air separation modules 106 similar to that illustrated in FIG. 3 are downstream from the air separation modules 106.

The flammability reduction system 100 also includes a controller 122 and a flow control valve 124. The controller 122 is configured to regulate the flow control valve 124 to control an amount of nitrogen-enriched-air 110 supplied to the fuel tanks 112.

In some examples, the system 114 for air separation module (ASM) management includes a processor 126 and a memory 128 associated with the processor 126. The memory 128 includes computer-readable program instructions 130 that, when executed by the processor 126 causes the processor 126 to perform a set of functions 132 for air separation module management as described in more detail with reference to method 500 described with reference to FIG. 5. In accordance with an example, the set of functions 132 include but are not necessarily limited to determining an amount of an nitrogen-enriched-air 110 to be supplied to each fuel tank 112 of a plurality of fuel tanks 112 of an aircraft 102; evaluating a status and usage of each air separation module 106 of a plurality of air separation modules 106; determining an optimal distribution of workload 118 among the plurality of air separation modules 106 based on the amount of the nitrogen-enriched-air 110 to be supplied to each fuel tank 112 and the status and usage of each air separation module 106; and regulating a valve 120 associated with each air separation module 106 or a group of air separation modules 106 based on the optimal distribution of workload 118 among each air separation module 106.

In the example in FIG. 1, the ASM management system 114 includes the controller 122 and the controller 122 includes the processor 126 and the memory 128. The set of functions 132 include the ASM management module 116. As previously described, the ASM management module 116 is configured to determine the optimal distribution of workload 118 among the plurality of air separation modules 106 based on an amount of nitrogen-enriched-air 110 to be supplied to each fuel tank 112 and a status and usage of each air separation module 106. The controller 122 is configured to individually or separately control regulation of each of the valves 120 based on the optimal distribution of workload 118 among the air separation modules 106.

The ASM management module 116 is configured to determine the optimal distribution of workload 118 using a benchmark performance database 134. The status and usage of each air separation module 106 are evaluated using the benchmark performance database 134. The benchmark performance database 134 includes an ASM reference model 136 or reference digital-twin of each air separation module 106. The status and usage of each air separation module 106 are evaluated by the ASM management module 116 using the ASM reference model 136 of each air separation module 106 in the benchmark performance database 134 as described in more detail herein.

In some examples, the system 114 for air separation module management includes an off-board application 138 for analyzing air separation module in-service data. The off-board application 138 is an application that is off-board the aircraft 102. The application 138 for analyzing air separation module in-service data is configured to evaluate status and usage of each air separation module 106 using a benchmark performance database similar to benchmark performance database 134. The off-board application 138 for analyzing air separation module in-service data performs the analysis during turn-around time of the aircraft 102 on a certain regular basis.

In accordance with some examples, the flammability reduction system 100 also includes an output sensor 140 configured to determine an amount of oxygen in the nitrogen-enriched-air 110 being supplied to the fuel tanks 112. The output sensor 140 is positioned downstream from the air separation modules 106.

In accordance with other examples, the flammability reduction system 100 includes an output sensor 140 configured to determine an amount of oxygen in the nitrogen-enriched-air 110 flowing from the plurality of air separation modules 106 and an input sensor 142 configured to determine an amount of oxygen in the conditioned air 108 being supplied to the plurality of air separation modules 106 from the air supply control system 104.

Figure 2:
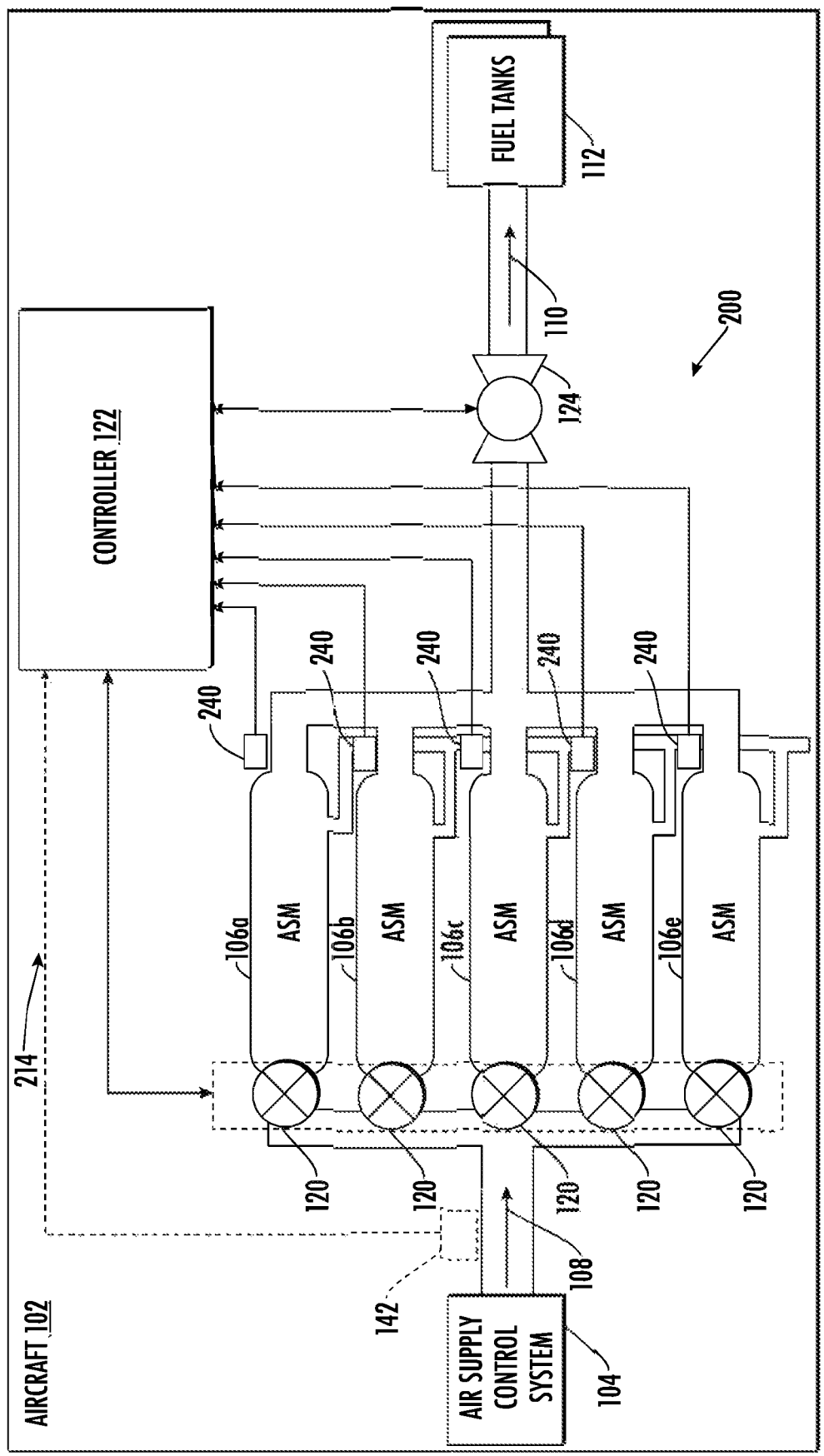
FIG. 2 is a block schematic diagram of another example of a flammability reduction system onboard an aircraft in accordance with the present disclosure.

FIG. 2 is a block schematic diagram of another example of a flammability reduction system 200 onboard an aircraft 102 in accordance with the present disclosure. The flammability reduction system 200 includes an ASM management system 214. The ASM management system 214 is substantially the same as the ASM management system 114 described with reference to FIG. 1. In the example in FIG. 2, the flammability reduction system 200 and/or ASM management system 214 include an output sensor 240 associated with each air separation module 106. Each output sensor 240 is configured to determine an amount of oxygen in the nitrogen-enriched-air 110 flowing from the associated air separation module 106. Similar to that previously described, the controller 122 or ASM management module 116 embodied in the controller 122 is configured to determine an optimal distribution of workload 118 (FIG. 1) among the plurality of air separation modules 106 based on the amount of nitrogen-enriched-air 110 to be supplied to each fuel tank 112 and based on a status and usage of each air separation module 106.

In another example, the flammability reduction system 200 also includes an input sensor 142 configured to determine an amount of oxygen in the conditioned air 108 being supplied to the plurality of air separation modules 106 from the air supply control system 104.

FIG. 3 is a block schematic diagram of another example of a flammability reduction system 300 onboard an aircraft 102 in accordance with the present disclosure. The flammability reduction system 300 includes an ASM management system 314 that is substantially the same as the ASM management system 114 described with reference to FIG. 1. The flammability reduction system 300 and/or ASM management system 314 include a valve 120 that regulates conditioned air 108 flowing into one or a group of air separation modules 106. The valves 120 are controlled or regulated by the controller 122 based on the optimal distribution of workload 118 to each air separation module 106. In other examples, the configuration of valves 120 in the example in FIG. 3 is also usable with the flammability reduction systems 100 and 200 and ASM management systems 114 and 214 in FIGS. 1 and 2.

Figure 4:
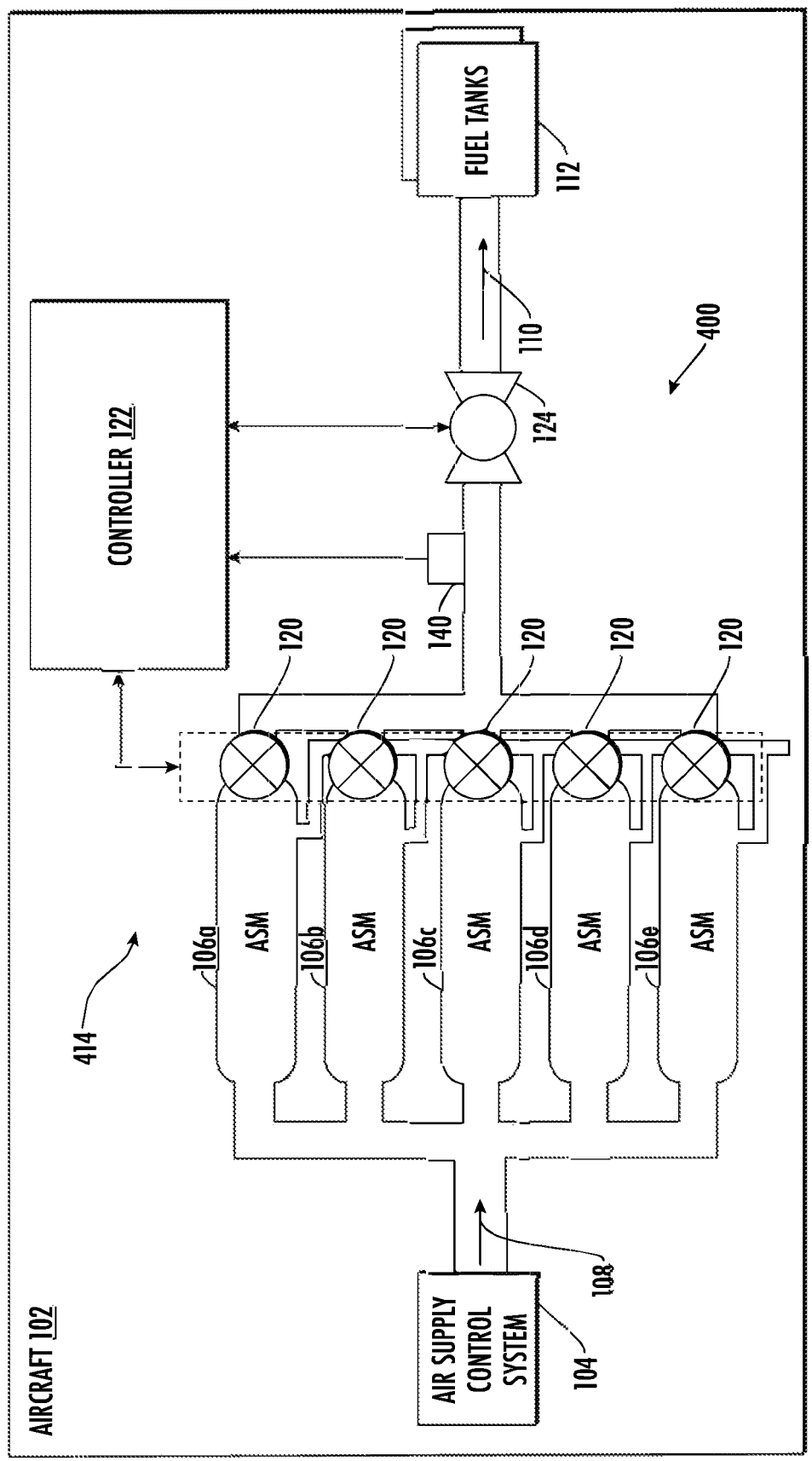
FIG. 4 is a block schematic diagram of a further example of a flammability reduction system onboard an aircraft in accordance with the present disclosure.

FIG. 4 is a block schematic diagram of a further example of a flammability reduction system 400 onboard an aircraft 102 in accordance with the present disclosure. The flammability reduction system 400 and the ASM management system 414 are substantially the same as the flammability reduction system 100 and ASM management system 114 in FIG. 1. In the exemplary flammability reduction system 400 in FIG. 4, the valve 120 associated with each air separation module 106 is downstream from the air separation module 106. Similar to that previously described, each valve 120 is regulated by the controller 122 or ASM management module 116 embodied in the controller 122 based on the optimal distribution of workload 118 among the air separation modules 106. In other examples, the valves 120 are associated with one or a group of air separation modules 106 similar to the example in FIG. 3 except the valves 120 are downstream from the air separation modules 106.

Figure 5:
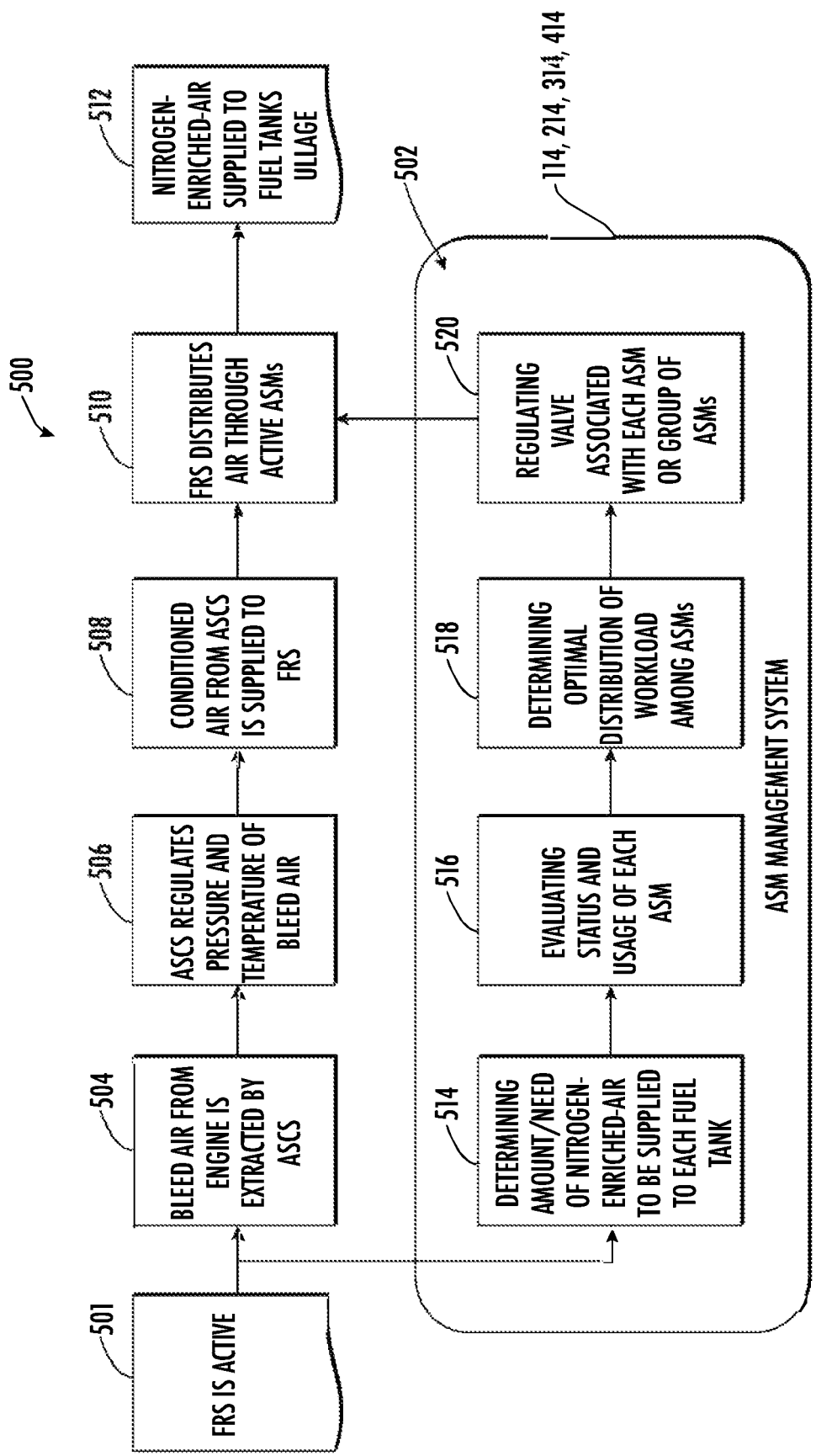
FIG. 5 is a flow chart of an example of a method for operating a flammability reduction system and air separation module management in accordance with an example of the present disclosure.

FIG. 5 is a flow chart of an example of a method 500 for operating a flammability reduction system and air separation module management in accordance with an example of the present disclosure. In some examples, the method 500 is embodied in and performed by the components of the flammability reduction systems 100, 200, 300, or 400 as described with reference to FIGS. 1-4. The method 500 also includes an exemplary method 502 for air separation module management that is embodied in and performed by any of the ASM management systems 114, 214, 314, or 414 in FIGS. 1-4. In some examples, the exemplary method 502 is embodied in the ASM management module 116 (FIG. 1).

In accordance with some examples, the method 502 includes at least determining 514 an amount of nitrogen-enriched-air 110 to be supplied to each fuel tank 112 of a plurality of fuel tanks 112 of an aircraft 102; evaluating 516 a status and usage of each air separation module 106 of a plurality of air separation modules 106 onboard the aircraft 102; determining 518 an optimal distribution of workload 118 among the plurality of air separation modules 106 based on the amount of the nitrogen-enriched-air 110 to be supplied to each fuel tank 112 and the status and usage of each air separation module 106; and regulating 520 a valve 120 associated with each air separation module 106 or a group of air separation modules 106 based on the optimal distribution of workload 118 to each air separation module 106.

In block 501, the flammability reduction system (FRS) 100, 200, 300, or 400 is active. In block 504, in some examples, bleed air from at least one engine of the aircraft 102 is extracted by the air supply control system (ASCS) 104. In other examples, air is extracted from other sources, for example, outside air. In block 506, the ASCS 104 regulates the pressure and temperature of the bleed air or air from another source. In block 508, conditioned air 108 from the ASCS 104 is supplied to the flammability reduction system (FRS) 100, 200, 300, or 400. In block 510, the flammability reduction system (FRS) 100, 200, 300, or 400 distributes the air through the air separation modules 106 that are selectively active by regulating 520 a valve 120 associated with each air separation module 106 or a group of air separation modules 106 (FIG. 3) based on the optimal distribution of workload 118 between each air separation module 106. In block 512, nitrogen-enriched-air is supplied to the fuel tanks ullage.

In block 514, the method 502 includes determining an amount of nitrogen-enriched-air 110 to be supplied to each fuel tank 112 of the plurality of fuel tanks 112 of the aircraft 102. A flow chart of an example of a method 600 for determining an amount or need of nitrogen-enriched-air 110 to be supplied to each fuel tank 112 will be described in more detail with reference to FIG. 6.

In block 516, the method 502 includes evaluating a status and usage of each air separation module 106 of the plurality of air separation modules 106 onboard the aircraft 102. A flow chart of an example of a method 700 for evaluating a status and usage of each air separation module 106 will be described in more detail with reference to FIG. 7.

In block 518, the method 502 includes determining an optimal distribution of workload 118 among the plurality of air separation modules 106 based on the amount of the nitrogen-enriched-air 110 to be supplied to each fuel tank 112 and the status and usage of each air separation module 106. A flow chart of an example of a method 900 for determining an optimal distribution of workload 118 among a plurality of air separation modules 106 will be described in more detail with reference to FIG. 9. In accordance with an example, the optimal distribution of workload 118 is determined using an optimization strategy, e.g., a cost function is minimized. In an example, an amount of usage among the air separation modules 106 is balanced. In another example, two groups of air separation modules 106 are each balanced based on an amount of usage or ranking. In this example, the aircraft 102 always has a group of air separation modules 106 in a more degraded state and another group of air separation modules 106 in a less degraded state. When the group of degraded air separation modules 106 reaches a usage level for replacement, the aircraft 102 still has the other group of air separation modules 106 in a less degraded or better, usable state. This prevents the situation of all air separation modules 106 having to be replaced at the same time, resulting in a longer maintenance downtime. Therefore, there is no risk of having all air separation modules 106 degraded and needing replacement at the same time.

In block 520, the method 502 includes regulating a valve 120 associated with each air separation module 106 or a group of air separation modules 106 (FIG. 3) based on the optimal distribution of workload 118 to each air separation module 106.

Figure 6:
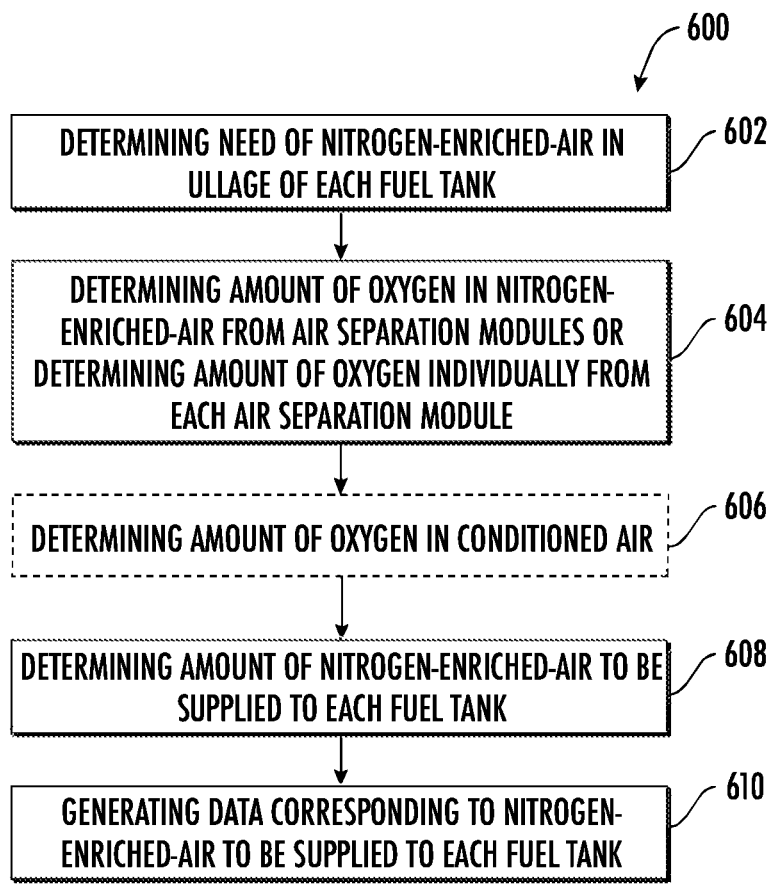
FIG. 6 is a flow chart of an example of a method for determining an amount or need of nitrogen-enriched-air to be supplied to each fuel tank in accordance with an example of the present disclosure.

FIG. 6 is a flow chart of an example of a method 600 for determining an amount or need of nitrogen-enriched-air 110 to be supplied to each fuel tank 112 in accordance with an example of the present disclosure. In accordance with some examples, the method 600 is used for block 514 in FIG. 5. In block 602, determining the amount of the nitrogen-enriched-air 110 to be supplied to each fuel tank 112 includes determining a need of the nitrogen-enriched-air 110 in ullage of each fuel tank 112. Determining the need of the nitrogen-enriched-air 110 in the ullage of each fuel tank 112 includes using a set of parameters. The set of parameters include but are not necessarily limited to a phase of flight of the aircraft 102, an outside air temperature, an altitude of the aircraft 102, fuel tank usage, and engine settings.

In block 604, the method 600 includes determining an amount of oxygen in nitrogen-enriched-air 110 flowing from the plurality of air separation modules 106. In accordance with an example, determining the amount of oxygen in the nitrogen-enriched-air 110 flowing from the air separation modules 106 includes using a single output sensor 140 as illustrated in FIG. 1.

In accordance with another example, determining the amount of the nitrogen-enriched-air 110 to be supplied to each fuel tank 112 in block 604 includes determining an amount of oxygen in the nitrogen-enriched-air flowing individually from each air separation module 106 of the plurality of air separation modules 106. Determining the amount of oxygen in the nitrogen-enriched-air flowing individually from each air separation module 106 includes using an output sensor 240 associated with each air separation module 106 as illustrated in the example in FIG. 2.

In block 606, the method 600 optionally includes determining an amount of oxygen in conditioned air 108 from an air supply control system 104. In accordance with an example, determining the amount of oxygen in the conditioned air 108 from the air supply control system 104 includes using at least one input sensor 142 upstream from the air separation modules 106 as illustrated in the example in FIG. 1.

In accordance with another example, determining the amount of the nitrogen-enriched-air 110 to be supplied to each fuel tank 112 includes determining an amount of oxygen in the nitrogen-enriched-air 110 flowing from the plurality of air separation modules 106 and determining an amount of oxygen in conditioned air being supplied to the plurality of air separation modules 106 from an air supply control system 104.

In accordance with a further example, determining the amount of the nitrogen-enriched-air 110 to be supplied to each fuel tank 112 includes determining an amount of oxygen in the nitrogen-enriched-air 110 flowing individually from each air separation module 106 of the plurality of air separation modules 106 and determining an amount of oxygen in conditioned air 108 being supplied to the plurality of air separation modules 106 from an air supply control system 104. In this example, determining the amount of oxygen in the nitrogen-enriched-air 110 flowing individually from each air separation module 106 includes using an output sensor 240 associated with each air separation module 106 as illustrated in the example in FIG. 2. Determining the amount of oxygen in the conditioned air 108 being supplied to the air separation modules 106 includes using at least a single input sensor 142 as illustrated in the example in FIG. 2.

In block 608, determining an amount of the nitrogen-enriched-air 110 to be supplied to each fuel tank 112 includes using an amount of oxygen in the nitrogen-enriched-air 110 flowing from the plurality of air separation modules 106 and a set of parameters. The set of parameters include but are not necessarily limited to a phase of flight of the aircraft 102, an outside air temperature, an altitude of the aircraft 102, fuel tank usage, and engine settings. Optionally, an amount of oxygen in the conditioned air 108 from the air supply control system 104 is also used in determining an amount of the nitrogen-enriched-air 110 to be supplied to each fuel tank 112. The distribution of nitrogen-enriched-air 110 among the fuel tanks 112 is performed based on a quantity of fuel in each fuel tank 112 and fuel tank pressure readings.

In block 610, the method 600 further includes generating data corresponding to the amount of nitrogen-enriched-air 110 to be supplied to each fuel tank 112 based on the set of parameters including at least a phase of flight of the aircraft, an outside air temperature, an altitude of the aircraft, fuel tank usage, engine settings, an amount of oxygen in the nitrogen-enriched-air 110 flowing from the plurality of air separation modules 106, optionally an amount of oxygen in the conditioned air 108, and ullage of each fuel tank 112.

Figure 7:
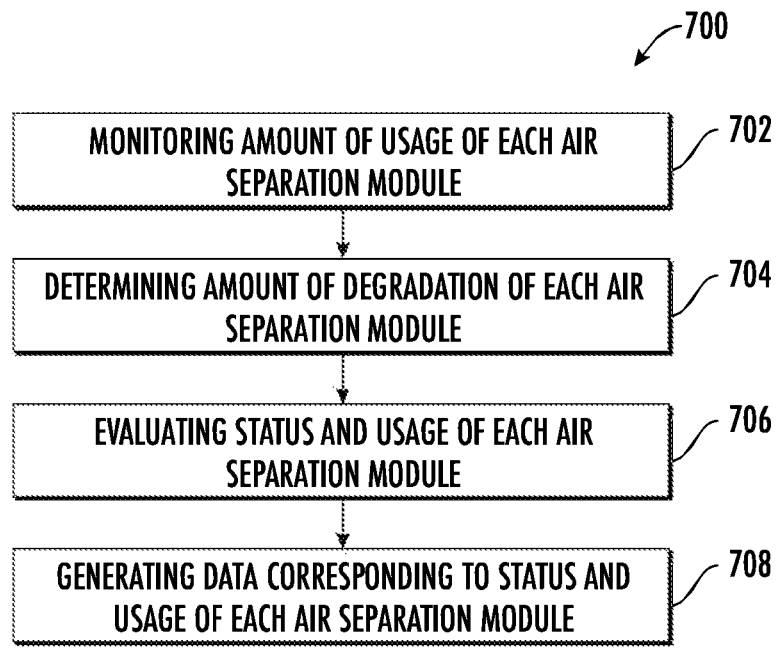
FIG. 7 is a flow chart of an example of a method for evaluating a status and usage of each air separation module in accordance with an example of the present disclosure.

FIG. 7 is a flow chart of an example of a method 700 for evaluating a status and usage of each air separation module 106 in accordance with an example of the present disclosure. In some examples, the method 700 is used for the block 516 in FIG. 5. In block 702, evaluating the status and the usage of each air separation module 106 includes monitoring an amount of usage of each air separation module 106 of the plurality of air separation modules 106. In some examples, monitoring an amount of usage of each air separation module 106 includes monitoring or tracking operation hours of each air separation module 106. The method 700 also includes storing the amount of usage of each air separation module 106 in a benchmark performance database 134.

Figure 8:
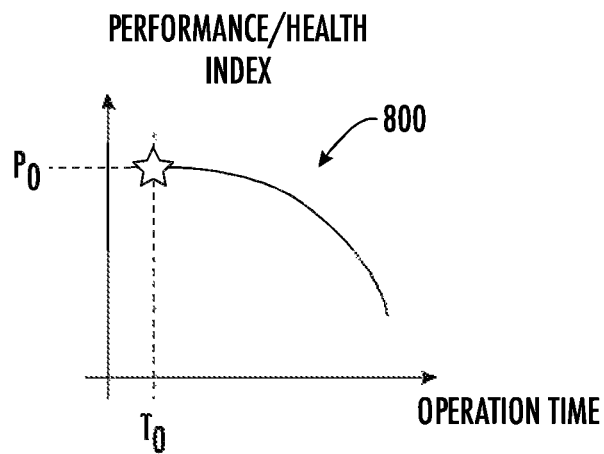
FIG. 8 is a graph illustrating performance or health versus operation time over a serviceable life of an exemplary air separation module.

In block 704, the exemplary method 700 includes determining an amount of degradation of each air separation module 106 based on the amount of prior usage of each air separation module 106. Referring also to FIG. 8, FIG. 8 is a graph 800 illustrating performance (P) or health versus operation time (t) over a serviceable life of an exemplary air separation module 106. As illustrated in FIG. 8, an initial performance or health ($P_0$) at an initial operation time ($T_0$)

of an exemplary air separation module 106 degrades approximately exponentially over operation time of the air separation module 106.

In block 706, the exemplary method 700 includes evaluating the status and usage of each air separation module 106 using a benchmark performance database 134. The status is defined as the efficiency or operational effectiveness of the air separation module 106 in filtering oxygen from the conditioned air 108.

In accordance with a first example, the benchmark performance database 134 is configured to track the efficiency of each air separation module 106 or group of air separation modules 106 as illustrated in FIG. 3 as a function of time which could be, for example, the number of flight hours, number of cycles, or the number of flights after installation of the air separation module 106 on the aircraft 102. The efficiency is tracked by comparing the oxygen concentration in the conditioned air 108, measured using an upstream or input sensor 142, to the oxygen concentration in the nitrogen-enriched-air 110, measured using a downstream or output sensor 140 (FIG. 1) or output sensors 240 (FIG. 2), after the air separation module 106 or group of air separation modules 106. In an example where the ASM management system 114 does not include an upstream or input sensor 142, a position of the flow control valve 120 is compared for two similar flight profiles, e.g., if on average the position of the valve 120 is more open, that is an indication that the air separation module 106 is becoming less efficient.

In accordance with a second example, the benchmark performance database 134 includes an ASM reference model 136 associated with each air separation module 106 that serves as a benchmark for tracking the efficiency of the associated air separation module 106. The ASM reference model 136 is based on empirical air separation module performance results. Operation time of the air separation module 106 is compared to the ASM reference model 136 to track the efficiency or performance/health index as illustrated in FIG. 8.

Both examples of using the benchmark performance database 134 can be leveraged to perform predictive maintenance. The first example predicts maintenance is coming due when the efficiency of the air separation module 106 falls below a predetermined level. The second example helps predict maintenance is coming due when the performance between in-service or actual air separation module 106 exceeds a preset threshold according to the associated ASM reference model 136.

In block 708, the method 700 includes generating data corresponding to the status and usage of each air separation module 106. The data is used in the determining the optimal distribution of workload 118 among each air separation module 106 in block 518 of FIG. 5.

Figure 9:
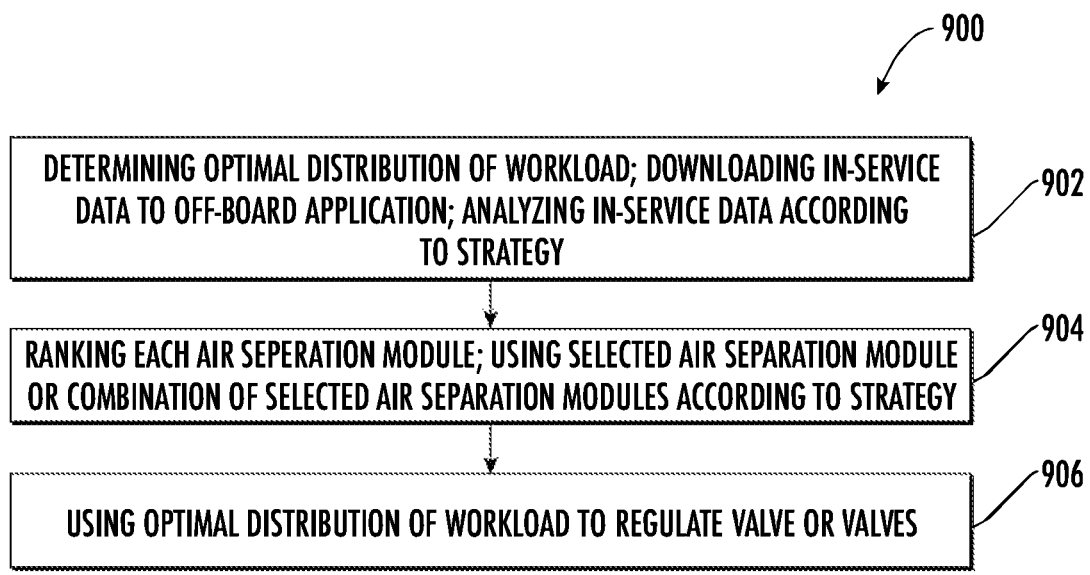
FIG. 9 is a flow chart of an example of a method for determining an optimal distribution of workload among a plurality of air separation modules in accordance with an example of the present disclosure.

FIG. 9 is a flow chart of an example of a method 900 for determining an optimal distribution of workload 118 among a plurality of air separation modules 106 in accordance with an example of the present disclosure. In some examples, the method 900 is used for the block 518 in FIG. 5.

In block 902, the method 900 includes determining the optimal distribution of workload 118 among the air separation modules 106 using data corresponding to the status and usage of each air separation module 106, e.g., using the method 700.

In accordance with an example, the method 900 includes downloading in-service data associated with each of the plurality of air separation modules 106 to an application 138 off-board the aircraft 102 for analyzing the in-service data; and analyzing the in-service data according to a strategy for optimal distribution of workload 118 among the air separation modules 106.

In block 904, the method 900 includes ranking each air separation module 106 of the plurality of air separation modules 106 based on an amount of prior usage. The method 900 also includes using a selected air separation module 106 or a combination of selected air separation modules 106 according to a strategy for optimal distribution of the workload 118 among the air separation modules 106.

In accordance with an example, a lower ranking of a particular air separation module 106 corresponds to a lower amount of prior usage of the particular air separation module 106. The strategy for the optimal distribution of workload 118 among the plurality of air separation modules 106 includes using the selected air separation module 106 or the combination of selected air separation modules 106 with the lower ranking or rankings before the air separation modules 106 with the higher rankings to balance an amount of usage among the air separation modules 106.

In accordance with another example, determining the optimal distribution of workload 118 among the plurality of air separation modules 106 includes using particular air separation modules 106 of the plurality of air separation modules 106 having a lower amount of usage before other air separation modules 106 having a higher amount of usage to balance an amount of usage among the air separation modules 106.

In block 906, the method 900 includes using the optimal distribution of workload 118 among the air separation modules 106 to regulate a valve 120 associated with each air separation module 106 or group of air separation modules 106 as described with reference to block 520 in FIG. 5.

Further, the disclosure comprises examples according to the following clauses:

Clause 1. A method for air separation module management, the method comprising:
  determining an amount of nitrogen-enriched-air to be supplied to each fuel tank of a plurality of fuel tanks of an aircraft;
  evaluating a status and usage of each air separation module of a plurality of air separation modules onboard the aircraft;
  determining an optimal distribution of workload among the plurality of air separation modules based on the amount of the nitrogen-enriched-air to be supplied to each fuel tank and the status and usage of each air separation module; and
  regulating a valve associated with each air separation module or a group of air separation modules based on the optimal distribution of workload to each air separation module.

Clause 2. The method of clause 1, wherein determining the amount of the nitrogen-enriched-air to be supplied to each fuel tank comprises determining an amount of oxygen in nitrogen-enriched-air flowing from the plurality of air separation modules.

Clause 3. The method of any of clauses 1 or 2, wherein determining the amount of the nitrogen-enriched-air to be supplied to each fuel tank comprises:
  determining an amount of oxygen in the nitrogen-enriched-air flowing from the plurality of air separation modules; and determining an amount of oxygen in conditioned air being supplied to the plurality of air separation modules from an air supply control system.

Clause 4. The method of any of clauses 1-2, or 3, wherein determining the amount of the nitrogen-enriched-air to be supplied to each fuel tank comprises determining an amount of oxygen in the nitrogen-enriched-air flowing individually from each air separation module of the plurality of air separation modules.

Clause 5. The method of any of clauses 1-3, or 4, wherein determining the amount of the nitrogen-enriched-air to be supplied to each fuel tank comprises:
  determining an amount of oxygen in the nitrogen-enriched-air flowing individually from each air separation module of the plurality of air separation modules; and
  determining an amount of oxygen in conditioned air being supplied to the plurality of air separation modules from an air supply control system.

Clause 6. The method of any of clauses 1-4, or 5, wherein determining the amount of the nitrogen-enriched-air to be supplied to each fuel tank comprises determining a need of the nitrogen-enriched-air in ullage of each fuel tank.

Clause 7. The method of any of clauses 1-5, or 6, wherein determining the need of the nitrogen-enriched-air in the ullage of each fuel tank comprises using a set of parameters comprising a phase of flight of the aircraft, an outside air temperature, an altitude of the aircraft, fuel tank usage, and engine settings.

Clause 8. The method of any of clauses 1-6, or 7, wherein determining the amount of the nitrogen-enriched-air to be supplied to each fuel tank comprises using an amount of oxygen in nitrogen-enriched-air flowing from the plurality of air separation modules and a set of parameters comprising a phase of flight of the aircraft, an outside air temperature, an altitude of the aircraft, fuel tank usage, and engine settings.

Clause 9. The method of any of clauses 1-7, or 8, further comprising generating data corresponding to the amount of nitrogen-enriched-air to be supplied to each fuel tank based on a set of parameters comprising a phase of flight of the aircraft, an outside air temperature, an altitude of the aircraft, fuel tank usage, engine settings, an amount of oxygen in the nitrogen-enriched-air flowing from the plurality of air separation modules, and ullage of each fuel tank.

Clause 10. The method of any of clauses 1-8, or 9, wherein evaluating the status and the usage of each air separation module comprises:
  monitoring an amount of usage of each air separation module of the plurality of air separation modules;
  evaluating the status and usage of each air separation module using a benchmark performance database; and
  generating data corresponding to the status and usage of each air separation module, wherein the data is used in the determining the optimal distribution of workload among each air separation module.

Clause 11. The method of any of clauses 1-9, or 10, wherein determining the optimal distribution of workload among the plurality of air separation modules comprises;
  ranking each air separation module of the plurality of air separation modules based on an amount of prior usage; and
  using a selected air separation module or a combination of selected air separation modules according to a strategy for the optimal distribution of workload among the plurality of air separation modules.

Clause 12. The method of any of clauses 1-10, or 11, wherein a lower ranking of a particular air separation module corresponds to a lower amount of prior usage of the particular air separation module, and wherein the strategy for the optimal distribution of workload among the plurality of air separation modules comprises using the selected air separation module or the combination of selected air separation modules with the lower ranking or rankings before the air separation modules with the higher rankings to balance an amount of usage among the air separation modules.

Clause 13. The method of any of clauses 1-11, or 12, wherein determining the optimal distribution of workload among the plurality of air separation modules comprises using particular air separation modules of the plurality of air separation modules having a lower amount of usage before other air separation modules having a higher amount of usage to balance an amount of usage among the air separation modules.

Clause 14. The method of any of clauses 1-12, or 13, further comprising:
  downloading in-service data associated with each of the plurality of air separation modules to an application off-board the aircraft for analyzing the in-service data; and
  analyzing the in-service data according to a strategy for optimal distribution of workload among the air separation modules.

Clause 15. A system for air separation module management, the system comprising:
  a processor; and
  a memory associated with the processor, the memory comprising computer-readable program instructions that, when executed by the processor causes the processor to perform the method of any of clauses 1-14, or 15.

Clause 16. A system for air separation module management, the system comprising:
  a controller for air separation module management, the controller comprising:
  a processor; and
  a memory associated with the processor, the memory comprising computer-readable program instructions that, when executed by the processor causes the processor to perform a set of functions comprising:
  determining an amount of nitrogen-enriched-air to be supplied to each fuel tank of a plurality of fuel tanks of an aircraft;
  evaluating a status and usage of each air separation module of a plurality of air separation modules;
  determining an optimal distribution of workload among the plurality of air separation modules based on the amount of the nitrogen-enriched-air to be supplied to each fuel tank and the status and usage of each air separation module; and
  regulating a valve associated with each air separation module or a group of air separation modules based on the optimal distribution of workload among each air separation module.

Clause 17. A flammability reduction system onboard an aircraft, comprising:
  a plurality of air separation modules connected in parallel, the plurality of air separation modules being configured to selectively supply nitrogen-enriched-air to each fuel tank of a plurality of fuel tanks of the aircraft;

an air separation module (ASM) management system comprising:
an ASM management module configured to determine an optimal distribution of workload among the plurality of air separation modules based on an amount of nitrogen-enriched-air to be supplied to each fuel tank and a status and usage of each air separation module; and
a valve associated with each air separation module or a group of the air separation modules of the plurality of air separation modules, wherein each of the valves is regulated based on the optimal distribution of the workload among the air separation modules.

Clause 18. The flammability reduction system of clause 17, further comprising a sensor configured to determine an amount of oxygen in the nitrogen-enriched-air being supplied to the fuel tanks.

Clause 19. The flammability reduction system of any of clauses 17 or 18, further comprising a sensor associated with each air separation module, each sensor being configured to determine an amount of oxygen in the nitrogen-enriched-air flowing from the associated air separation module.

Clause 20. The flammability reduction system of any of clauses 17-18, or 19, further comprising:
an output sensor configured to determine an amount of oxygen in the nitrogen-enriched-air flowing from the plurality of air separation modules; and
an input sensor configured to determine an amount of oxygen in the conditioned air being supplied to the plurality of air separation modules from an air supply control system.

Clause 21. The flammability reduction system comprising:
a processor; and
a memory associated with the processor, the memory comprising computer-readable program instructions that, when executed by the processor causes the processor to perform the method of any of clauses 1-14, or 15.

The subject disclosure may be a system, a method, and/or a computer program product. In some examples, the set of functions are embodied on a computer program product, such as memory or other computer program product as described herein. The computer program product may include a computer-readable storage medium (or media) having computer-readable program instructions thereon for causing a processor to carry out aspects of the subject disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the subject disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some examples, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the subject disclosure.

Aspects of the subject disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer-readable program instructions.

The flowchart and block diagrams in the Figures illustrate the architecture, functionality, and operation of possible implementations of systems, methods, and computer program products according to various examples of the subject disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular examples only and is not intended to be limiting of examples of the disclosure. As used herein, the singular forms "a", "an" and "the" are intended to include the plural forms as well, unless the context clearly indicates otherwise. It will be further understood that the terms "include," "includes," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present examples has been presented for purposes of illustration and description, but is not intended to be exhaustive or limited to examples in the form disclosed. Many modifications and variations will be apparent to those of ordinary skill in the art without departing from the scope and spirit of examples.

Although specific examples have been illustrated and described herein, those of ordinary skill in the art appreciate that any arrangement which is calculated to achieve the same purpose may be substituted for the specific examples shown and that the examples have other applications in other environments. This application is intended to cover any adaptations or variations. The following claims are in no way intended to limit the scope of examples of the disclosure to the specific examples described herein.

What is claimed is:

1. A method for air separation module management, the method comprising:
   determining an amount of nitrogen-enriched-air to be supplied to each fuel tank of a plurality of fuel tanks of an aircraft based on:
      determining an amount of oxygen in nitrogen-enriched-air flowing from a plurality of air separation modules; and
      determining an amount of oxygen in conditioned air being supplied to the plurality of air separation modules from an air supply control system;
   evaluating a status and usage of each air separation module of the plurality of air separation modules onboard the aircraft;
   determining an optimal distribution of workload among the plurality of air separation modules based on the amount of the nitrogen-enriched-air to be supplied to each fuel tank and the status and usage of each air separation module; and
   regulating a valve based on the optimal distribution of workload to each air separation module, the valve being associated with an air separation module of the plurality of air separation modules or being associated with a group of air separation modules of the plurality of air separation modules.

2. The method of claim 1, wherein determining the amount of the nitrogen-enriched-air to be supplied to each fuel tank comprises determining an amount of oxygen in the nitrogen-enriched-air flowing individually from each air separation module of the plurality of air separation modules.

3. The method of claim 1, wherein determining the amount of the nitrogen-enriched-air to be supplied to each fuel tank comprises determining a need of the nitrogen-enriched-air in ullage of each fuel tank.

4. The method of claim 3, wherein determining the need of the nitrogen-enriched-air in the ullage of each fuel tank comprises using a set of parameters comprising a phase of flight of the aircraft, an outside air temperature, an altitude of the aircraft, fuel tank usage, and engine settings.

5. The method of claim 1, wherein determining the amount of the nitrogen-enriched-air to be supplied to each fuel tank comprises using the amount of oxygen in nitrogen-enriched-air flowing from the plurality of air separation modules and a set of parameters comprising a phase of flight of the aircraft, an outside air temperature, an altitude of the aircraft, fuel tank usage, and engine settings.

6. The method of claim 1, further comprising generating data corresponding to the amount of nitrogen-enriched-air to be supplied to each fuel tank based on a set of parameters comprising a phase of flight of the aircraft, an outside air temperature, an altitude of the aircraft, fuel tank usage, engine settings, the amount of oxygen in the nitrogen-enriched-air flowing from the plurality of air separation modules, and ullage of each fuel tank.

7. The method of claim 1, wherein evaluating the status and the usage of each air separation module comprises:
   monitoring an amount of usage of each air separation module of the plurality of air separation modules;
   evaluating the status and usage of each air separation module using a benchmark performance database; and
   generating data corresponding to the status and usage of each air separation module, wherein the data is used in the determining of the optimal distribution of workload among each air separation module.

8. The method of claim 1, wherein determining the optimal distribution of workload among the plurality of air separation modules comprises;
   ranking each air separation module of the plurality of air separation modules based on an amount of prior usage; and
   using a selected air separation module or a combination of selected air separation modules according to a strategy for the optimal distribution of workload among the plurality of air separation modules.

9. The method of claim 8, wherein a lower ranking of a particular air separation module corresponds to a lower amount of prior usage of the particular air separation module, and wherein the strategy for the optimal distribution of workload among the plurality of air separation modules comprises using the selected air separation module or the combination of selected air separation modules with the lower ranking or rankings before the air separation modules with the higher rankings to balance an amount of usage among the air separation modules.

10. The method of claim 1, wherein determining the optimal distribution of workload among the plurality of air separation modules comprises using particular air separation modules of the plurality of air separation modules having a lower amount of usage before other air separation modules having a higher amount of usage to balance an amount of usage among the air separation modules.

11. The method of claim 1, further comprising:
   downloading in-service data associated with each of the plurality of air separation modules to an application off-board the aircraft for analyzing the in-service data; and
   analyzing the in-service data according to a strategy for optimal distribution of workload among the air separation modules.

12. A system for air separation module management, the system comprising:

a processor; and a memory associated with the processor, the memory comprising computer-readable program instructions that, when executed by the processor causes the system to perform operations comprising:

determining an amount of nitrogen-enriched-air to be supplied to each fuel tank of a plurality of fuel tanks of an aircraft based on:

determining an amount of oxygen in nitrogen-enriched-air flowing from a plurality of air separation modules; and determining an amount of oxygen in conditioned air being supplied to the plurality of air separation modules from an air supply control system;

evaluating a status and usage of each air separation module of the plurality of air separation modules;

determining an optimal distribution of workload among the plurality of air separation modules based on the amount of the nitrogen-enriched-air to be supplied to each fuel tank and the status and usage of each air separation module; and regulating a valve based on the optimal distribution of workload to each air separation module, the valve being associated with an air separation module of the plurality of air separation modules or being associated with a group of air separation modules of the plurality of air separation modules.

13. The system of claim 12, wherein evaluating the status and the usage of each air separation module comprises:

monitoring an amount of usage of each air separation module of the plurality of air separation modules;

evaluating the status and usage of each air separation module using a benchmark performance database; and generating data corresponding to the status and usage of each air separation module, wherein the data is used in the determining of the optimal distribution of workload among each air separation module.

14. The system of claim 12, wherein determining the optimal distribution of workload among the plurality of air separation modules comprises;

ranking each air separation module of the plurality of air separation modules based on an amount of prior usage; and using a selected air separation module or a combination of selected air separation modules according to a strategy for the optimal distribution of workload among the plurality of air separation modules.

15. The system of claim 12, wherein determining the optimal distribution of workload among the plurality of air separation modules comprises using particular air separation modules of the plurality of air separation modules having a lower amount of usage before other air separation modules having a higher amount of usage to balance an amount of usage among the air separation modules.

16. A flammability reduction system onboard an aircraft, comprising:

a plurality of air separation modules connected in parallel, the plurality of air separation modules being configured to selectively supply nitrogen-enriched-air to each fuel tank of a plurality of fuel tanks of the aircraft;

one or more valves that are each associated with an air separation module of the plurality of air separation modules or a group of air separation modules of the plurality of air separation modules;

an input sensor configured to determine an amount of oxygen in conditioned air being supplied to the plurality of air separation modules from an air supply control system;

a sensor configured to determine an amount of oxygen in the nitrogen-enriched-air being supplied to the fuel tanks, the sensor including an output sensor configured to determine an amount of oxygen in the nitrogen-enriched-air flowing from the plurality of air separation modules; and an air separation module (ASM) management system comprising:

a processor; and a memory associated with the processor, the memory comprising computer-readable program instructions that, when executed by the processor causes the ASM system to perform operations comprising:

determining an amount of nitrogen-enriched-air to be supplied to each fuel tank of the plurality of fuel tanks of the aircraft based on:

determining the amount of oxygen in the nitrogen-enriched-air flowing from the plurality of air separation modules; and determining the amount of oxygen in the conditioned air being supplied to the plurality of air separation modules from the air supply control system;

evaluating a status and usage of each air separation module of the plurality of air separation modules;

determining an optimal distribution of workload among the plurality of air separation modules based on the amount of the nitrogen-enriched-air to be supplied to each fuel tank and the status and usage of each air separation module; and regulating a valve of the one or more valves based on the optimal distribution of workload among each air separation module.

17. The flammability reduction system of claim 16, wherein evaluating the status and the usage of each air separation module comprises:

monitoring an amount of usage of each air separation module of the plurality of air separation modules;

evaluating the status and usage of each air separation module using a benchmark performance database; and generating data corresponding to the status and usage of each air separation module, wherein the data is used in the determining of the optimal distribution of workload among each air separation module.

18. The flammability reduction system of claim 16, wherein determining the optimal distribution of workload among the plurality of air separation modules comprises;

ranking each air separation module of the plurality of air separation modules based on an amount of prior usage; and using a selected air separation module or a combination of selected air separation modules according to a strategy for the optimal distribution of workload among the plurality of air separation modules.

19. The flammability reduction system of claim 18, wherein a lower ranking of a particular air separation module corresponds to a lower amount of prior usage of the particular air separation module, and wherein the strategy for the optimal distribution of workload among the plurality of air separation modules comprises using the selected air separation module or the combination of selected air separation modules with the lower ranking or rankings before the air separation modules with the higher rankings to balance an amount of usage among the air separation modules.

20. The flammability reduction system of claim 16, wherein determining the optimal distribution of workload among the plurality of air separation modules comprises using particular air separation modules of the plurality of air separation modules having a lower amount of usage before other air separation modules having a higher amount of usage to balance an amount of usage among the air separation modules.

* * * * *